US011928547B2

(12) United States Patent
Han et al.

(10) Patent No.: US 11,928,547 B2
(45) Date of Patent: Mar. 12, 2024

(54) SCANNING APPARATUS, METHOD, DEVICE AND STORAGE MEDIUM (71) Applicant: Beijing Jingdong Zhenshi Information Technology Co., Ltd., Beijing (CN)

(72) Inventors: Jinhui Han, Beijing (CN); Kun Wang, Beijing (CN); Wenxiang Yang, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 35 days.

(21) Appl. No.: 17/630,904

(22) PCT Filed: Mar. 24, 2020

(86) PCT No.: PCT/CN2020/080784
§ 371 (c)(1),
(2) Date: Jan. 27, 2022

(87) PCT Pub. No.: WO2021/047164
PCT Pub. Date: Mar. 18, 2021

(65) Prior Publication Data
US 2022/0391607 A1 Dec. 8, 2022

(30) Foreign Application Priority Data

Sep. 10, 2019 (CN) .......................... 201910850987.9

(51) Int. Cl.
*G06Q 30/00* (2023.01)
*G01G 19/42* (2006.01)
*G06K 7/10* (2006.01)

(52) U.S. Cl.
CPC ......... *G06K 7/10861* (2013.01); *G01G 19/42* (2013.01); *G06K 7/10762* (2013.01); *G06K 2007/10504* (2013.01)

(58) Field of Classification Search
CPC .......... G06K 7/10831; G06K 7/10594; G06K 15/00; G06K 7/10881; G06K 19/14; G06Q 30/0621
(Continued)

(56) References Cited

U.S. PATENT DOCUMENTS 10,002,377 B1 * 6/2018 Johnson ............. G06Q 30/0631
10,268,860 B2 4/2019 Gao
(Continued)

FOREIGN PATENT DOCUMENTS

CN 203199637 U 9/2013
CN 103692213 A 4/2014
(Continued)

OTHER PUBLICATIONS

International Search Report for PCT/CN2020/080784, dated Jun. 30, 2020, 2 pgs.
(Continued)

*Primary Examiner* — Daniel St Cyr
(74) *Attorney, Agent, or Firm* — Blank Rome LLP (57) ABSTRACT Disclosed are scanning equipment, a method, a device and a storage medium thereof. The equipment comprises a rotatable rotating component, a scanning device, and a positioning device, where: the positioning device is used for respectively positioning the rotating component rotated to different predetermined positions, and the scanning device is used for scanning goods held on the rotating component having been positioned.

18 Claims, 7 Drawing Sheets

(58) Field of Classification Search
USPC .................. 235/385, 376, 462, 14, 462.38
See application file for complete search history.

(56) References Cited

U.S. PATENT DOCUMENTS

| | | | |
|---|---|---|---|
| 10,853,600 | B2 | 12/2020 | Tachibana et al. |
| 2016/0171267 | A1* | 6/2016 | Li .................... G06K 7/10544 235/462.32 |
| 2018/0181786 | A1 | 6/2018 | Gao |
| 2019/0228448 | A1* | 7/2019 | Bleicher ............ G06Q 30/0631 |
| 2019/0257642 | A1* | 8/2019 | Hillebrand .......... G01C 11/025 |
| 2020/0202095 | A1* | 6/2020 | Yoda .................... G06K 7/1456 |

FOREIGN PATENT DOCUMENTS

| | | |
|---|---|---|
| CN | 204872792 U | 12/2015 |
| CN | 107008656 A | 8/2017 |
| CN | 107451503 A | 12/2017 |
| CN | 207802110 U | 8/2018 |
| CN | 207802110 U | 8/2018 |
| CN | 109911598 A | 6/2019 |
| CN | 109967364 A | 7/2019 |
| CN | 110147692 A | 8/2019 |
| CN | 110147692 A | 8/2019 |
| CN | 110598496 A | 12/2019 |
| CN | 210295104 U | 4/2020 |
| JP | 3586583 B2 | 11/2004 |
| WO | 2010123458 A1 | 10/2010 |

OTHER PUBLICATIONS

CN Examination Report for CN2019108509879, dated Sep. 10, 2019, 2 pgs.
Supplementary European Search Report for EP Application No. 20863865.0, dated Jun. 7, 2023.

* cited by examiner

Fig. 12

SCANNING APPARATUS, METHOD, DEVICE AND STORAGE MEDIUM

This patent application is a national stage of International Application No. PCT/CN2020/080784, filed on Mar. 24, 2020, which claims the priority from Chinese Patent Application No. 201910850987.9, filed on Sep. 10, 2019 and titled "SCANNING APPARATUS, METHOD, DEVICE AND STORAGE MEDIUM". Both of the aforementioned applications are hereby incorporated by reference in their entireties.

TECHNICAL FIELD

The present disclosure relates to the field of logistics, in particular to a scanning apparatus, a scanning method, a scanning device and a storage medium.

BACKGROUND

At present, with the rapid development of e-commerce, the number of item orders has increased geometrically. In the warehousing link of logistics, efficient operations and connections between operation nodes are required. A first node is to put items into warehouses, which is usually managed through the serial numbers of the items. The items to be input into the warehouses are attached with the serial numbers and the serial numbers are scanned one by one, and finally the acceptance and warehousing of items are completed.

SUMMARY

The present disclosure provides a scanning apparatus, and the apparatus includes a rotatable rotation component, a scanning device, and a positioning device.

The positioning device is configured for positioning the rotation component when the rotation component rotates to different predetermined positions respectively, and the scanning device is configured for scanning an item placed on the positioned rotation component.

The present disclosure further provides an item scanning method, the method is based on the scanning apparatus, and the method includes:
receiving a positioning signal sent by the positioning device when the rotation component rotates to the different predetermined positions;
stopping rotating the rotation component according to the positioning signal and generating a scanning instruction; and
scanning the item placed on the rotation component by the scanning device according to the scanning instruction to acquire identification information on the to-be-scanned item.

The present disclosure further provides a scanning device, and the device includes:
a receiving module, configured to receive a positioning signal sent by the positioning device when the rotation component rotates to the different predetermined positions;
a generating module, configured to stop rotating the rotation component according to the positioning signal and generate a scanning instruction; and
a scanning module, configured to scan the to-be-scanned item placed on the rotation component by the scanning device according to the scanning instruction to acquire identification information on the to-be-scanned item.

The present disclosure further provides another scanning apparatus, and the apparatus includes: a processor and a memory.

The memory, storing an application program executable by the processor, is configured to cause the processor to perform the steps of the scanning method.

The present disclosure further provides a computer-readable storage medium, storing a computer program thereon, and the program, when executed by a processor, performs the steps of the scanning method.

REFERENCE NUMERALS

1 Rotation component
101 Rotation part
102 Power device
103 Item container
104 Limit structure
105 Slope
11 First Surface
12 Rotation shaft
13 Positioning mark
14 Weighing device
2 Scanning device
21 Lifting moving device
22 Lateral moving device
23 Scanning head 3 Positioning device
31 Detection position
201 Receiving module
202 Generating module
203 Scanning module

DETAILED DESCRIPTION OF EMBODIMENTS

The following will clearly and completely describe the technical solution in embodiments of the present disclosure in conjunction with the accompanying drawings in the embodiments of the present disclosure. Obviously, the described embodiments are only a part of the embodiments of the present disclosure, rather than all of the embodiments. Based on the embodiments in the present disclosure, all other embodiments obtained by those skilled in the art without creative work shall fall within the protection scope of the present disclosure.

The terms "first", "second", "third", "fourth", etc. (if any) in the specification and claims of the present disclosure and the above accompanying drawings are used to distinguish similar objects, and are not necessarily used to describe a specific order or sequence. It should be understood that the data used in this way may be interchanged under appropriate circumstances, so that the embodiments of the present disclosure described herein, for example, can be implemented in a sequence other than those illustrated or described herein. In addition, the terms "including" and "having", as well as any variations thereof are intended to cover non-exclusive inclusions. For example, processes, methods, systems, products, or apparatuses that include a series of steps or units are not necessarily limited to those clearly listed, but may include those that are not clearly listed, or other steps or units inherent to these processes, methods, products or apparatuses.

The technical solution of the present disclosure will be described in detail below with reference to the embodiments. The following embodiments may be combined with each other, and same or similar concepts or processes may not be repeated in some embodiments.

As mentioned above, in the process of item warehousing, it is necessary to scan a serial number attached to an item, which is however generally still completed by manually scanning the serial number. As the quantity of item becomes more and more, the workload in manual mode is gradually increasing and the efficiency is becoming low, which severely restricts the efficiency of an entire logistics supply chain.

Figure 1:
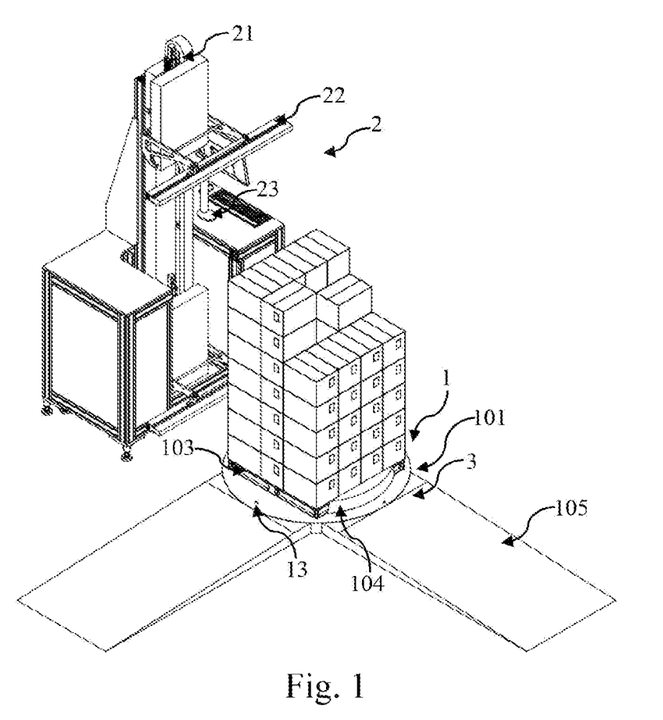
FIG. 1 is a schematic diagram of an external structure 100 of an item scanning apparatus in an embodiment of the present disclosure.
Figure 2:
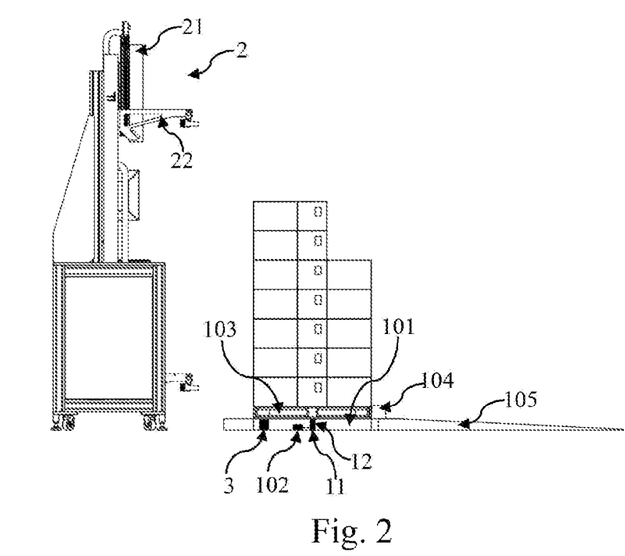
FIG. 2 is a schematic diagram of an external structure 200 of the item scanning apparatus in an embodiment of the present disclosure.

Therefore, the embodiments of the present disclosure propose a scanning apparatus, a scanning method, a scanning device, and a storage medium. An item may be rotated to different predetermined positions by the rotation component, and the item may be scanned and identified by the scanning device, which may improve the efficiency of scanning the item in the process of item warehousing, thereby avoiding the problem of inefficiency in the entire logistics supply chain. FIG. 1 is a schematic diagram of an external structure 100 of an item scanning apparatus in an embodiment of the present disclosure, and FIG. 2 is a schematic diagram of an external structure 200 of an item scanning apparatus in an embodiment of the present disclosure. As shown in FIG. 1 and FIG. 2, in an embodiment, the present disclosure provides a scanning apparatus, and the scanning apparatus includes a rotatable rotation component 1 and a scanning device 2, and a positioning device 3.

The positioning device 3 is configured for positioning the rotation component 1 when the rotation component 1 rotates to different predetermined positions respectively; and The scanning device 2 is configured for scanning an item placed on the positioned rotation component 1.

In the present embodiment, a specific structure of the scanning apparatus is provided. In the process of item warehousing, the item is placed on the rotation component 1, and the scanning device 2 may scan the rotation component 1 when the rotation component 1 rotates to the different predetermined positions.

For example, in an item warehousing scenario, the scanning device 2 may scan different planes of the rotation component 1, and when placing the item, a side of the item on which a serial number is attached is placed at a position where the scanning device 2 can scan. The scanning device 2 scans the serial number of the item and enters the serial number into a backend system to complete a task of acceptance and warehousing of the item.

In addition to the serial number on the item, the item may alternatively be classified by an item code. There may be two situations in the scanning process. If the item code and the serial number of the item are on the same plane, different categories of the item may be placed on the rotation component 1 for scanning. Because in this regard, the scanning device 2 may obtain both the serial number and the item code in the process of scanning the item, the category and the serial number of the item may be identified at the same time. On the contrary, if the item code and the serial number of the item are not on the same plane, when scanning, it is preferable to scan the serial number, so that the serial number should be preferentially exposed for scanning by the scanning device 2, and only a single category of the item is placed on the rotation component 1, and then the item code of the single category is entered into the backend system.

In order to support the specific functions and specific operating environments of the scanning apparatus, the scanning apparatus may alternatively include an operating table, a display component, and a control cabinet. The operating table should be arranged with adjustable feet and castors, and the adjustable feet and castors adjust a position of the operating table.

Figure 3:
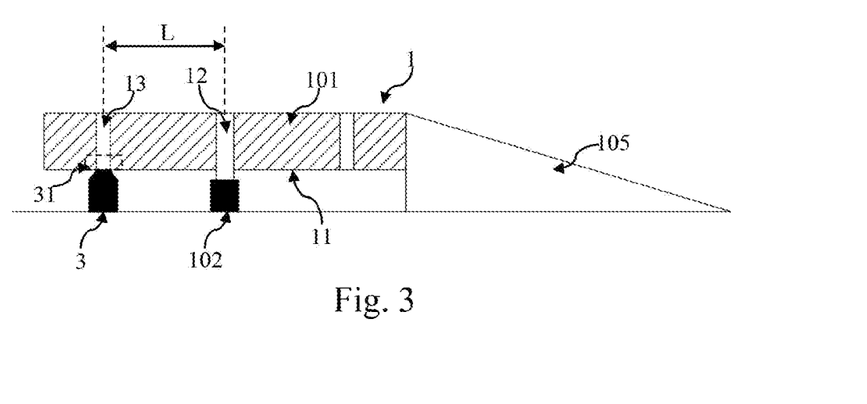
FIG. 3 is a schematic structural diagram of a rotation component in an embodiment of the present disclosure.
Figure 4:
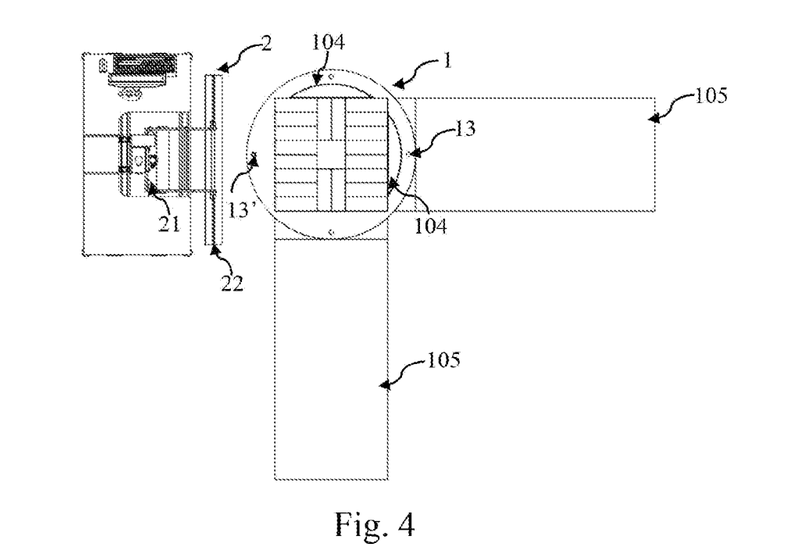
FIG. 4 is a schematic diagram of an external structure 300 of the item scanning apparatus in an embodiment of the present disclosure.
Figure 5:
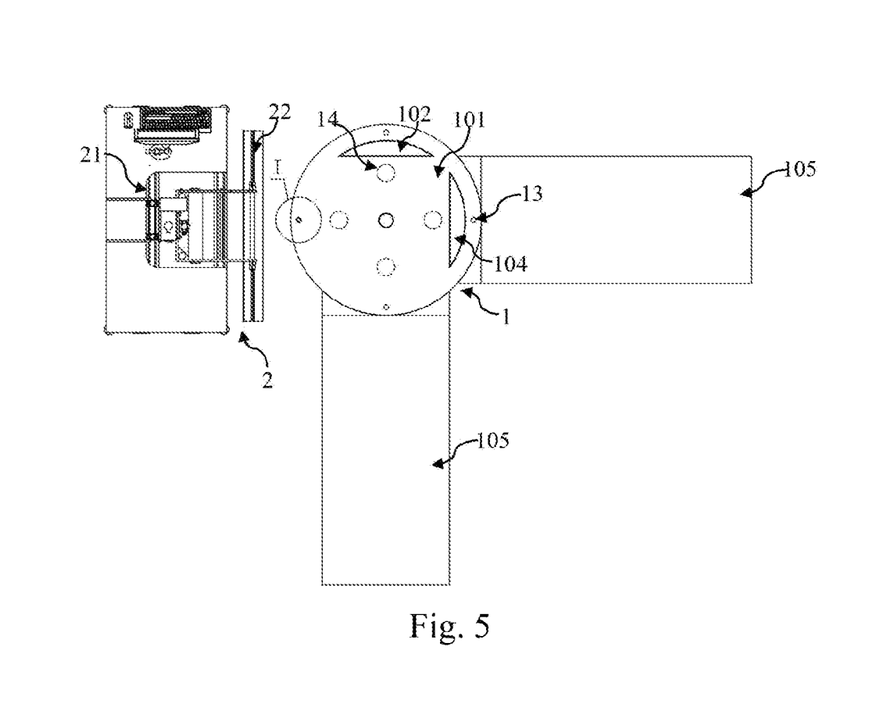
FIG. 5 is a schematic diagram of an external structure 400 of the item scanning apparatus in an embodiment of the present disclosure.
Figure 6:
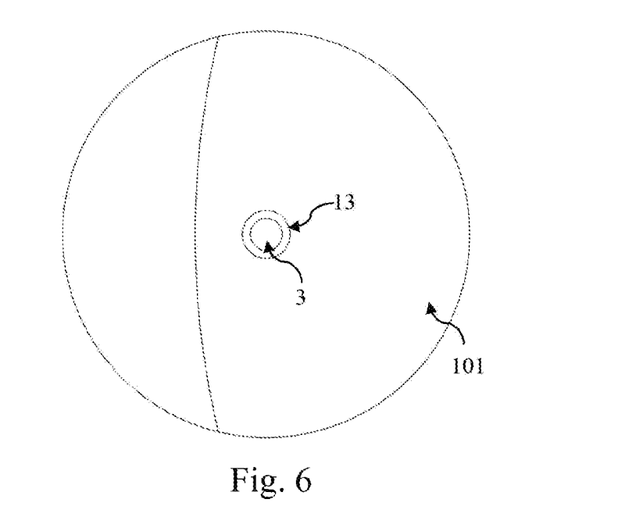
FIG. 6 is an enlarged schematic diagram of a partial structure I of the item scanning apparatus in FIG. 5 of the present disclosure.

FIG. 3 is a schematic structural diagram of a rotation component in an embodiment of the present disclosure, FIG. 4 is a schematic diagram of an external structure 300 of an item scanning apparatus in an embodiment of the present disclosure, FIG. 5 is a schematic diagram of an external structure 400 of an item scanning apparatus in an embodiment of the present disclosure, and FIG. 6 is an enlarged schematic diagram of a partial structure I of the item scanning apparatus in FIG. 5 of the present disclosure. As shown in FIGS. 3 and 4, and FIGS. 5 and 6, in an embodiment, a plurality of positioning marks 13 are arranged at a periphery of a first surface 11 of the rotation component 1 around an axis of a rotation shaft 12 of the rotation component 1, and each of the positioning marks 13 corresponds to one of the predetermined positions, a radial distance between each of the positioning marks 13 and the rotation shaft 12 is L.

The positioning device 3 is configured to perform a detection on the rotation component 1, a detection position 31 of the positioning device 3 is located on the first surface 11 of the rotation component 1, and a radial distance between the detection position 31 and the rotation shaft 12 is L, so that during the rotation of the rotation component 1, the rotation component 1 is positioned, when the positioning device 3 detects the positioning mark 13 at the detection position.

In the present embodiment, a specific structure of the rotation component 1 and the positioning device 3 is provided, so that the scanning device 2 may position the item when the item is at different rotation positions on the rotation component 1. First, the different predetermined positions on the rotation component 1 may be marked. For example, four sides of the item may be marked as CM1, CM2, CM3, and CM4, respectively, and the four sides are different by 90 degrees. CM1 may be used as an initial surface, and after finishing scanning the side of CM1, the scanning device 2 may scan CM2, CM3, and CM4 in sequence.

In an embodiment, the positioning mark 13 is a light-transmitting through hole, the light-transmitting through hole penetrates the rotation component 1, the positioning device 3 is a photoelectric sensor, and a probe of the photoelectric sensor faces the detection position 31, so that during the rotation of the rotation component 1, the rotation component 1 is positioned when the probe detects light transmitting through the light-transmitting through hole.

In the present embodiment, a specific implementation for detecting through a photoelectric sensor is provided. When the probe is aligned with the light-transmitting through hole, external light irradiates to the probe at this time, and then, it is determined that the rotation position of the rotation component 1 is the predetermined position. Obviously, the predetermined position may be one or more. For example, on the four sides of the rotation component 1, four predetermined positions, namely CM1, CM2, CM3, and CM4, may be positioned. If the scanning device 2 is arranged at a side of the rotation component 1, then by scanning the above four sides of the rotation component, all the four sides of the item may be scanned. Therefore, when items are stacked, the to-be-scanned serial numbers need to be placed at a position on the item where the serial numbers can be displayed. It should be noted that a positional relationship between the rotation component 1 and the scanning device 2 provided in the present embodiment is only to better describe the present embodiment, and is not a limitation to the present embodiment.

The rotation component 1 may be understood as a turntable. The photoelectric sensor calibrates the position of CM1 as an origin position. An initial position of the turntable is that the light-transmitting through hole exactly coincides with the center of the photoelectric sensor, and an initial position of the light-transmitting through hole is marked at the same time. When the scan of the CM1 side is completed, a motor drives the turntable to automatically rotate. After the turntable rotates automatically, the light-transmitting through hole in the position of CM1 is far away from the photoelectric sensor, and then the photoelectric sensor is blocked by the turntable and obtains a blocking light signal. When the turntable automatically rotates until a second circular hole coincides with the center of the photoelectric sensor, the photoelectric sensor obtains a relevant signal, then the turntable stops rotating, and starts scanning and collecting the serial number of the item on the side of CM2, and the procedure is repeated until the serial numbers on the sides of CM3 and CM4 are scanned and collected;

In an embodiment, the rotation component 1 includes a rotation part 101 and a power device 102, and the power device 102 drives the rotation part 101 to rotate around the rotation shaft 12 arranged vertically.

The item is placed on a top surface of the rotation part 101, a bottom surface of the rotation part 101 is the first surface 11 of the rotation component 1, and the probe is arranged close to the first surface 11.

In the present embodiment, a specific method for placing item on the rotation part 101 is provided. The item is placed on the top of the rotation part 101. The rotation part 101 here may alternatively be understood as a turntable. The rotation shaft 12 drives the turntable to rotate. Here, the rotation shaft 12 being arranged vertically may be understood to ensure that even if the rotation shaft 12 is not perpendicular to the ground or plane on which the scanning device is placed, the item placed on the rotation part 101 may be stably placed on the top of the rotation part 101 during the rotation of the rotation part 101. When the probe is close to the first surface 11, light cannot enter the photoelectric sensor through the probe. After the rotation part 101 rotates, the light-transmitting through hole is aligned with the probe, light transmits from the light-transmitting through hole into the photoelectric sensor, and the photoelectric sensor realizes the positioning of the predetermined positions.

In an embodiment, the item is placed on the top surface of the rotation part 101 through an item container 103.

A limit structure 104 is arranged on at least one side of the top surface of the rotation part 101 for limiting the item container 103.

In the present embodiment, a limiting method of the rotation part 101 is provided. The item may be placed on the top surface of the rotation part 101 through the item container 103. The item container 103 may be understood as a pallet. When the item container 103 is configured to hold the item, the item container 103 needs to be limited relative to the rotation part 101. The limit structure 104 may be understood as a barrier arranged along at least one side edge of the pallet. In some embodiments, two corresponding barriers may be arranged on two sides of the top of the rotation part 101, where the two sides are perpendicular to each other. Since the item should be placed on the top surface of the top of the rotation part 101 and the item should not move up and down when the rotation part 101 rotates, two barriers being arranged on the top surface of the top of the rotation part 101 may achieve limiting the pallet in two mutually perpendicular directions, thereby ensuring that not only the item container 103 may be limited during the rotation, but also the item is always stably placed.

An surface of the limit structure 104 contacting the pallet is a vertical plane, and an surface of the limit structure 104 has an arc shape.

In an embodiment, a slope 105 is arranged at least one side of the rotation part 101, one end of the slope 105 is connected to the top surface of the rotation part 101, and the other end of the slope 105 is in contact with a contact surface on which the rotation part 101 is placed, such that a slope surface is formed.

The present embodiment provides a specific structure for unloading the pallet on the top of the rotation part 101. The pallet may be unloaded from the top of the rotation part 101 to a bottom of the rotation part 101 through the slope 105.

In an embodiment, a weighing device 14 is arranged on the rotation component 1, and the weighing device 14 is configured for weighing the item.

In the present embodiment, a weighing apparatus 14 is provided for weighing the item on the rotation component 1 to help record when the item is input into a warehouse.

In an embodiment, the scanning device 2 is arranged at a side of the rotation component 1; and the scanning device 2 includes a lifting moving device 21 and/or a lateral moving device 22, and a scanning head 23.

In some embodiments, if the scanning device 2 includes the lifting moving device 21 or the lateral moving device 22 and the scanning head 23, the scanning head 23 is arranged on the lifting moving device 21 or on the lateral moving device 22.

In some embodiments, if the scanning device 2 includes the lifting moving device 21 and the lateral moving device 22, and the scanning head 23, the lateral moving device 22 is arranged on the lifting moving device 21, so that the lifting moving device 21 drives the lateral moving device 22 to move up and down, and the scanning head 23 is arranged on the lateral moving device 22, so that the lateral moving device 22 drives the scanning head to move laterally; and the scanning head 23 is directed to a position where the item is placed on the rotation component 1, so as to scan the item; and the scanning head 23 includes an infrared scanning code camera and a radio frequency identification device.

In some embodiments, the number of the scanning heads 23 is plural, and a width of a combined scanning range of the plurality of scanning heads 23 is greater than a width of the item.

In some embodiments, in order to facilitate efficient scanning, after the positioning mark 13 positions the rotation component 1, at least one plane of the item placed on the rotation component 1 positioned by the positioning mark 13 is parallel to a plane of a moving direction of the lifting moving device 21 or the lateral moving device 22.

Specifically, after the positioning mark 13 positions the rotation component 1, a plane of the item placed on the rotation component 1 positioned by the positioning mark 13 is parallel to the plane of the moving direction of the lifting moving device 21 or the lateral moving device 22, where the plane of the item faces the scanning head and is closest to the scanning head.

In the present embodiment, a specific structure of the scanning device 2 is provided. The lifting moving device 21 is supported by a frame. Based on a positional relationship between the item and the rotation component 1 described above, when the scanning device 2 is located at the side of the rotation component 1, the scanning device 2 may scan respective planes of the item. The lifting moving device 21 and the lateral moving device 22 may make the scanning head 23 scan a side surface of the rotation component 1 in a plane range and then scan in an area around the item by cooperating with the rotation of the rotation component 1. The scanning head 23 may be understood as a camera, and the camera achieves its function by installing auxiliary parts, such as a support and a light source, that is, the camera is configured for automatically collecting and scanning images.

Figure 7A:
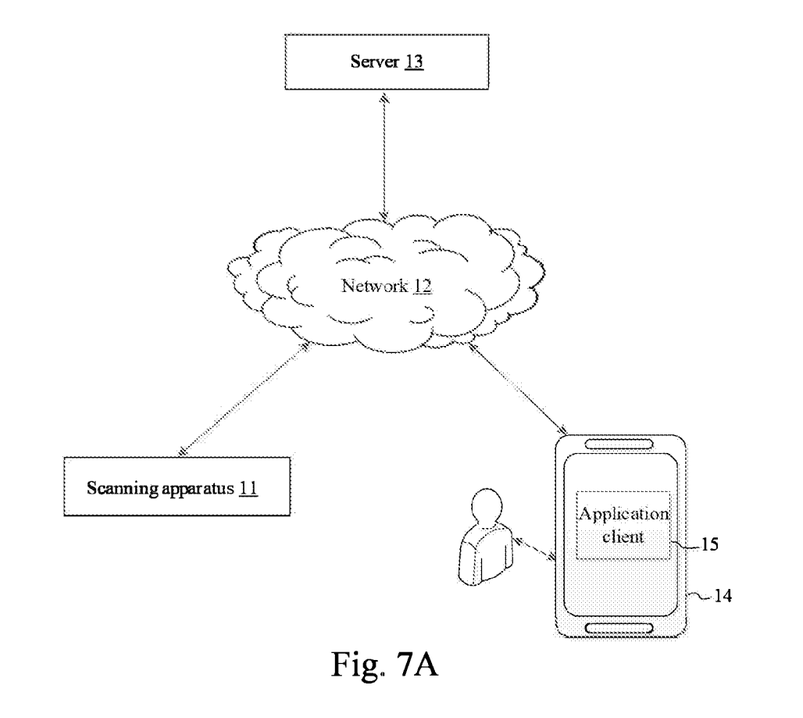
FIG. 7A is a schematic diagram of a system structure to which an item scanning method may be applied in an embodiment of the present disclosure.

Corresponding to the scanning apparatus, an embodiment of the present disclosure further provides an item scanning method. FIG. 7A shows a schematic diagram of a system structure to which an item scanning method may be applied in an embodiment of the present disclosure. As shown in FIG. 7A, the system to which the item scanning method may be applied according to the present disclosure includes at least: a scanning apparatus 11, a network 12, and a server 13. In addition, the system to which the item scanning method may be applied further includes a handheld device 14 of a staff.

In some examples of the present disclosure, the scanning apparatus 11 includes the rotatable rotation component 1, the scanning device 2, and the positioning device 3 shown in FIGS. 1 and 2. The item may be rotated to the different predetermined positions by the rotation component, the item may be scanned and identified by the scanning device. Scanned item information, such as an identifier of the item, may be sent to a backend system in the server 11.

The network 12 may include a wired network and a wireless network. As shown in FIG. 7A, on the access network side, the scanning apparatus 11 and the handheld device 14 may access the network 12 in a wireless approach or in a wired approach; and on the core network side, the server 13 is generally connected to the network 12 in a wired approach. Of course, the server 13 may alternatively be connected to the network 12 in a wireless approach.

The server 13 is a backend server that records item information. The server 13 may receive the item information scanned by the scanning apparatus 11, and may alternatively return the corresponding item information to the handheld device 14 according to a query request from the handheld device 14 of the staff. The server 13 may be a single server or a cluster server composed of a plurality of servers.

The handheld device 14 may refer to a hand-held smart terminal device of an item management staff. The handheld device may include, but is not limited to, a smart phone (installed with a communication module), a palmtop computer, a tablet computer, and the like. The handheld device 14 has an operating system installed thereon, including but not limited to: Android operating system, Symbian operating system, Windows mobile operating system, Apple iPhone OS operating system, and so on. The handheld device 14 generally includes an application client 15 to enable the staff to perform operations such as querying on the item information.

Figure 7B:
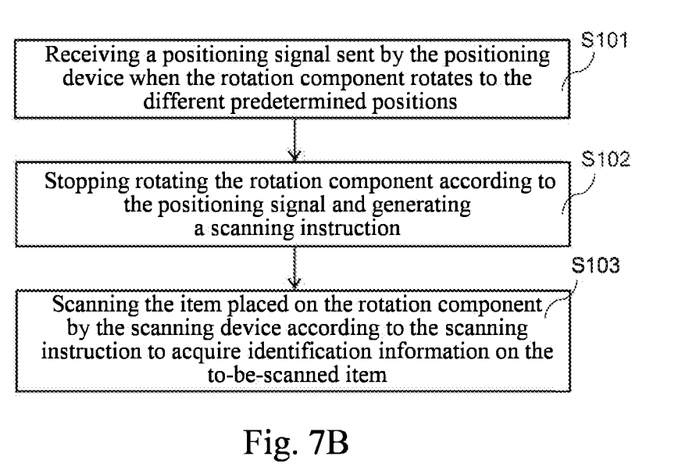
FIG. 7B is a schematic diagram of a flow 500 of the item scanning method in an embodiment of the present disclosure.

Based on the above system structure shown in FIG. 7A, the item scanning method provided by an embodiment of the present disclosure is performed by the scanning apparatus 11 shown in FIG. 7A. FIG. 7B is a schematic diagram of a flow 500 of the item scanning method in an embodiment of the present disclosure. As shown in FIG. 7B, the method includes:

S101, receiving a positioning signal sent by the positioning device 3 when the rotation component 1 rotates to the different predetermined positions.

In this step, the positioning device 3 positions the rotation component 1 when the rotation component rotates to the different predetermined positions. The rotation component 1 may define the left and right planes and the front and back planes around the rotation component 1 as the predetermined positions, and one of the planes may be selected as an initial plane. The positioning signal is transmitted when the rotation component 1 rotates to the initial plane, the positioning signal is transmitted once every time the rotation component 1 rotates to a next predetermined position, so that the backend system receives positioning signals sent by the positioning device 3.

S102, stopping rotating the rotation component 1 according to the positioning signal and generating a scanning instruction.

In this step, when the positioning signal is received, the rotation component 1 stops rotating, and an instruction for stopping the rotation of the rotation component 1 may be sent after the backend system receives the positioning signal. Alternatively, an instruction interaction may be formed between the positioning device 3 and the rotation component 1, the positioning device 3 sends the positioning signal and the instruction for stopping the rotation of the rotation component 1 at the same time.

S103, scanning the item placed on the rotation component 1 by the scanning device 2 according to the scanning instruction to acquire identification information on the to-be-scanned item.

In this step, a specific implementation for scanning the item placed on the rotation component 1 is provided. The rotation component 1 at each of the predetermined positions is scanned respectively. Through this step, the identification information of different planes at the predetermined positions may be obtained, the identification information being attached to the to-be-scanned item. The identification information may be understood as the serial number and/or the item code, the serial number represents a serial number of the item of the warehousing, and the item code is used to identify the category of the to-be-scanned item.

In the present embodiment, a specific implementation for scanning the item at the different predetermined positions by the scanning apparatus is provided. Whenever the rotation component 1 rotates to the different predetermined positions, the positioning device 3 may send the positioning signals. When the backend system receives the positioning signals, it makes the rotation component 1 stop rotating. Then, the scanning device 2 scans the rotation component 1 at the predetermined positions to acquire the identification information, the identification information of the item is attached to the item. The identification information may be understood as the serial number and/or the item code, the serial number is used to identify a serial number of the item of the warehousing, and the item code is used to identify the category of the item.

In some embodiments, when scanning the item placed on the rotation component 1 by the scanning device 2 according to the scanning instruction to acquire the identification information on the to-be-scanned item, the scanning device 2 may be controlled to scan the item placed on the rotation component 1 according to a first preset scanning path.

The first preset scanning path includes a plurality of scanning path points, and these scanning path points are preset according to the size of the item.

In some embodiments, when controlling the scanning device 2 to scan the item placed on the rotation component 1 according to the first preset scanning path, if the identification information is successfully scanned at a current scanning path point, the scanning device 2 is controlled to move according to the first preset scanning path to a next scanning path point to perform scanning, until the scanning path points on the first preset scanning path are fully scanned; and if the identification information is failed to be scanned at the current scanning path point, information of the current scanning path point is recorded, and the scanning device 2 is controlled to move according to the first preset scanning path to the next scanning path point to perform scanning, until the scanning path points on the first preset scanning path are fully scanned.

In some embodiments, after the scanning path points on the first preset scanning path are fully scanned, the scanning device 2 may further be controlled to sequentially return to recorded scanning path points where scan of the identification information is failed, and may perform a second scan; and if the second scan is failed, abnormal information may be generated, and the scanning path point where the second scan is failed may be photographed to record an item position corresponding to the scanning path point where the second scan is failed.

In some embodiments, the scanning apparatus may send the generated abnormal information directly to the handheld device of the item management staff, or send the abnormal information to the server, and the server forwards the abnormal information to the handheld device of the item management staff, so that when the staff receives the abnormal information, he may check the item corresponding to the scanning path point where the second scan is failed.

In some embodiments, after completing the second scan of the recorded scanning path points where the scan is failed, the rotation component 1 may alternatively be controlled to rotate to a next predetermined position, and perform scanning according to a second preset scanning path, until the item is scanned at the respectively predetermined positions.

The second preset scanning path may be the same as or different from the first preset scanning path, and may alternatively include a plurality of scanning path points. These scanning path points are preset according to the size of the item.

In some embodiments, each of the predetermined positions corresponds to a preset scanning path, and preset scanning paths may be the same or different.

In an embodiment, before the step of receiving a positioning signal sent by the positioning device 3 when the rotation component 1 rotates to the different predetermined positions, the method further includes:

entering shelf life information of the to-be-scanned item according to a first predetermined operation of a user.

In the present embodiment, a specific implementation for entering the shelf life is provided. In the process of warehousing of the to-be-scanned item, the user may first call warehousing information of the item, and the user needs to call whether there is a shelf life that needs to be entered from the warehousing information, because one kind of the item does not have a shelf life, or a shelf life is very long such that it may be considered that there is no shelf life, and another kind of the item has a shelf life, so the above two kinds need to be distinguished. If the to-be-scanned item has a shelf life, then the shelf life is entered. Conversely, if the to-be-scanned item does not have a shelf life, a state of no shelf life, i.e., "no shelf life management" is recorded.

In an embodiment, before the step of receiving a positioning signal sent by the positioning device 3 when the rotation component 1 rotates to the different predetermined positions, the method further includes:

acquiring a rated quantity of the to-be-scanned item according to a second predetermined operation of a user.

In the present embodiment, a specific implementation in which the user may enter the rated quantity of the to-be-scanned item into the warehousing information is provided.

Figure 8:
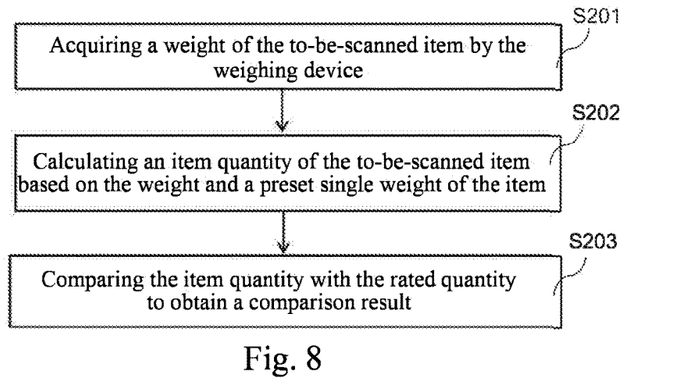
FIG. 8 is a schematic diagram of a flow 600 of the item scanning method in an embodiment of the present disclosure.

FIG. 8 is a schematic diagram of a flow 600 of the item scanning method in an embodiment of the present disclosure. As shown in FIG. 8, in an embodiment, a weighing device 14 is arranged on the rotation component 1, and is configured for weighing the item, and before the step of receiving a positioning signal sent by the positioning device 3 when the rotation component 1 rotates to the different predetermined positions, the method further includes:

S201, acquiring a weight of the to-be-scanned item by the weighing device 14;

In this step, the weight of the item is acquired by the weighing device 14.

S202, calculating an item quantity of the to-be-scanned item based on the weight and a preset single weight of the item;

In this step, a specific implementation for calculating the item quantity is provided, and the estimated item quantity may be calculated based on the weight and the preset single weight of the item. It should be noted that the preset single weight of the item is based on the single weight of one single item of the corresponding to-be-scanned item. In addition, the item quantity is not an actual quantity of the item, but only a reference quantity calculated for the checking and accepting of the item quantity and for comparison in the subsequent steps.

Step 203, comparing the item quantity with the rated quantity to obtain a comparison result.

The item quantity in the previous step is compared with the rated quantity. When the item quantity is less than the rated quantity, it indicates that the actual quantity of the item does not reach the rated quantity, and a stacking quantity of the item may be wrong and need to be checked.

In the present embodiment, a specific implementation for checking and accepting the actual quantity of the to-be-scanned item is provided. The weight of the to-be-scanned item is acquired by the weighing device 14, the item quantity is calculated based on the weight and the preset single weight of the item, and finally the comparison result is obtained by comparing the item quantity with the rated quantity. Based on the comparison result, it is confirmed whether the stacking quantity of the item is correct.

In an embodiment, the to-be-scanned item is placed on a top surface of the rotation component 1 through the item container 103, before the step of receiving a positioning signal sent by the positioning device 3 when the rotation component 1 rotates to the different predetermined positions, the method further includes:

acquiring an item container number of the item container 103 according to a third predetermined operation of a user.

Figure 9:
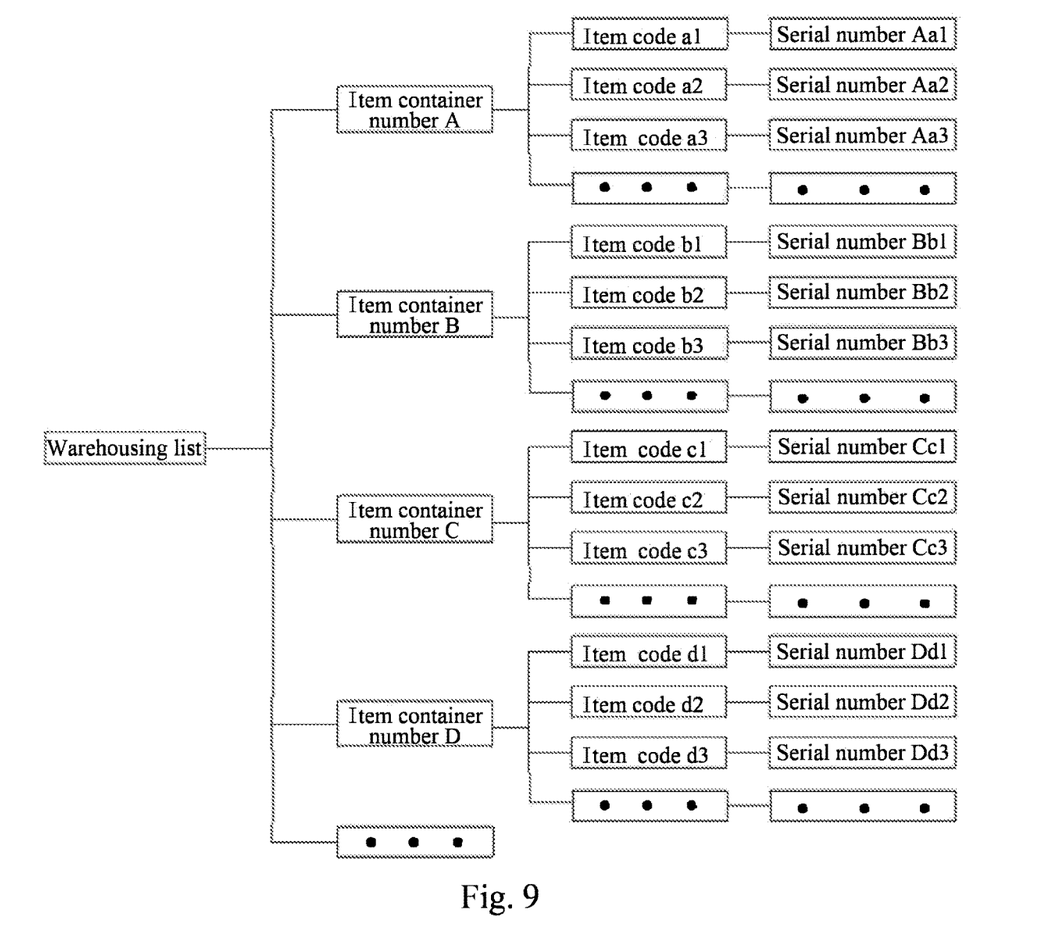
FIG. 9 is a schematic diagram of a data structure of a warehousing list in the present disclosure.

FIG. 9 is a schematic diagram of a data structure of a warehousing list in the present disclosure. As shown in FIG. 9, the present embodiment provides a user operation, which enters the item container number of the item container 103 corresponding to the entered serial number and/or the item code of the to-be-scanned item.

Working Process and Basic Principles:

In the following, the technical solution of the present disclosure will be further described by taking the process of checking, accepting and warehousing of item as an example. It should be noted that the process of checking, accepting and warehousing of the item is only to better describe the present disclosure, rather than a limitation to the present disclosure.

In the process of checking, accepting and warehousing of the item, the item may be attached with an identifier, the identifier may be understood as the serial number and/or the item code, the serial number is used to identify the sequence of the item, and the item code is used to identify the category of the item. The checking and accepting process of the item is to enter, check and accept the serial number and the item code on each item.

An operator responsible for checking, accepting and warehousing may log in through the handheld device 14 shown in FIG. 7A. A login method may be using an employee account of the operator to log in. Warehousing information of the item may be called from a pre-stored data source by scanning a warehousing list code. Scanning the warehousing information may be understood as scanning an identification code on the warehousing information. The warehousing information is item information of the item that is distributed in a logistics system. The item information includes but is not limited to: a name of the item, an item code, a serial number, whether there is the shelf life (production date, expiration date, shelf life days), an item feature, an item box size and other related information. We place the item code of the item on the rotation component 1, where the item code may be scanned in the next step, and items stacked on the rotation component 1 are called the to-be-scanned items. It should be noted that when stacking the to-be-scanned items, the serial numbers attached to the to-be-scanned items should be provided on the outside preferentially to facilitate later scanning. In addition, each warehousing is performed in the form of batches. If to-be-scanned items in a certain batch are excessive, the batch of the excessive to-be-scanned items needs to be separately stacked on the rotation component 1 for several times.

Figure 10:
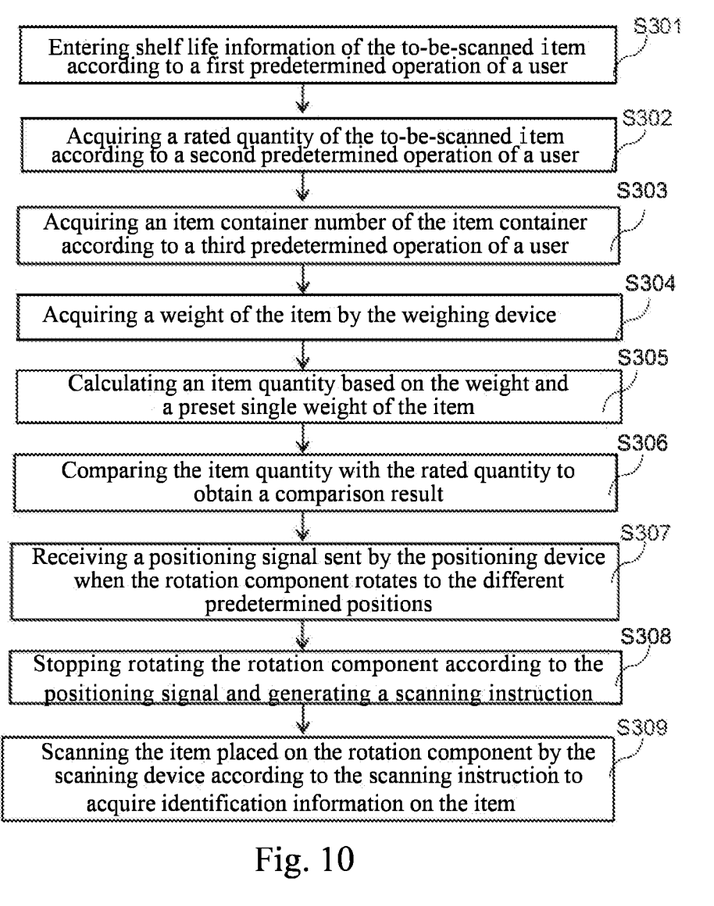
FIG. 10 is a schematic diagram of a flow 700 of the item scanning method in an embodiment of the present disclosure.

Based on the above scanning apparatus, the scanning method corresponding to the scanning apparatus includes:

FIG. 10 is a schematic diagram of a flow 700 of the item scanning method in an embodiment of the present disclosure.

As shown in FIG. 10, in an embodiment, the scanning method includes:

S301, entering shelf life information of the to-be-scanned item according to a first predetermined operation of a user.

In the checking and accepting process in this step, since some kinds of the item have no shelf life, such as iron pots, or cups, and some kinds of the item have a shelf life, such as food, it is necessary to enter the shelf life information corresponding to the item in the warehousing information into the relevant content in the checking and accepting process. If there is no management requirement of the shelf life for the accepted item, the description of "no shelf life management" may be directed entered. If the item has a shelf life, the shelf life may be entered.

Step 302, acquiring a rated quantity of the to-be-scanned item according to a second predetermined operation of a user.

In this step, the user may enter the rated quantity of the to-be-scanned item on the warehousing list into the backend system. The rated quantity may be denoted as N1.

Step 303, acquiring an item container number of the item container 103 according to a third predetermined operation of a user.

In this step, the user may enter the item container numbers. If the to-be-scanned items are stacked through the item containers, the item containers 103 may be understood as pallets. Then, the to-be-scanned item that should be stacked corresponding to each of the item containers 103 may be correspondingly entered, checked and accepted. Then, each of the item containers 103 corresponds to one of the item container numbers, after manually entering the item container numbers, the scanned to-be-scanned items may be correspondingly entered. In addition, this step may alternatively be implemented by scanning the item container numbers attached on the item containers 103. Each of the item containers 103 may be attached with a corresponding unique item container number (for example, a barcode may be used) for scanning. The scanning apparatus may manually use PAD to collect the item container numbers. A scanned item container is placed on the top surface of the rotation part 101 and is limited by the limit structure 104. When the item container is a pallet, two sides of the pallet are respectively pushed on the limit structure 104 to realize limiting.

Step 304, acquiring a weight of the item by the weighing device;

Before this step, it is necessary to confirm a placing approach of the to-be-scanned item on the rotation component 1;

If the serial number and the item code of a to-be-scanned item are on the same plane, that is, both may be scanned by the scanning device 2, different categories of the to-be-scanned items may be placed when the to-be-scanned items are placed on the rotation component 1. It is because only when the item codes are scanned, the categories of the to-be-scanned items can be confirmed, and in the above placing approach, the item codes of the to-be-scanned items may be scanned by the scanning device 2, so that the different categories of to-be-scanned items may be placed.

If the serial number and the item code of a to-be-scanned item are on different planes, that is, when only the serial numbers of the to-be-scanned items can be scanned by the scanning device 2, it is necessary to only place a single category of the to-be-scanned items when the to-be-scammed items are placed.

After placing the to-be-scanned item according to the above approach, the weight of the placed to-be-scanned items may be obtained by weighing by the weighing device, and the weight is denoted as W. If the item container is used to hold the to-be-scanned item according to the above steps, then a weight of the item container is denoted as W1.

Step 305, calculating an item quantity based on the weight and a preset single weight of the item;

In this regard, if the to-be-scanned item are a single item, the single weight of the to-be-scanned item may be known based on information in the warehousing list, that is, the preset single weight, which is denoted as W2. Even if the placed to-be-scanned items are not a single item, an average weight of the to-be-scanned items may be used as the preset single weight. The weight of each of the to-be-scanned items is obtained through the warehousing list, or a sum of the weight of each of the to-be-scanned item is divided by the quantity of the to-be-scanned item, which may also be used as the preset single weight for subsequent calculations. The item quantity is calculated according to the formula n=(W−W1)/W2.

Step 306, comparing the item quantity with the rated quantity to obtain a comparison result.

The comparison result in this step is:

If the item quantity is less than the rated quantity, it may be understood that the placed to-be-scanned items may be out of stock and do not meet the quantity in the warehousing list, that is, the items are fully checked and accepted. If the item quantity is equal to the rated quantity, it may be understood that the placed to-be-scanned items meet the quantity in the warehousing list, that is, the items are fully checked and accepted.

Step 307, receiving a positioning signal sent by the positioning device 3 when the rotation component 1 rotates to the different predetermined positions;

In this step, a specific positioning method is provided. For example, four sides around the rotation component 1 are respectively understood as four of the predetermined positions of CM1, CM2, CM3, and CM4.

Step 308, stopping rotating the rotation component 1 according to the positioning signal and generating a scanning instruction;

This step provides a specific implementation for stopping rotating the rotation component 1 according to the positioning signal and generating the scanning instruction.

S309, scanning the item placed on the rotation component by the scanning device according to the scanning instruction to acquire identification information on the item.

In this step, a specific implementation for scanning the identification information is provided. The scanning head is initialized before scanning. The scanning head may be understood as a camera. The content of the initialization includes a camera position and focus adjustment, a camera pixel resolution adjustment, a light source brightness and angle adjustment. When using in a batch, the initialization adjustments are only required for the first boot, and are not required for subsequent collecting serial numbers in a batch.

Automatic checking, accepting and collecting of item serial numbers: an automatic checking and accepting device is started to automatically collect the item serial numbers. First, the device performs an overall scanning on a first plane of CM1, then the device automatically rotates by 90 degrees and performs an overall scanning on a second plane of CM2. The above steps are repeated, until the device completes performing overall scanning on a plane of CM3 and a plane of CM4 in sequence.

When the serial number is scanned and serial number information is read at the same time, a photo is saved and the predetermined position where the serial number is read and a color (for example, green) are marked; when the serial number is scanned but the information is not read, the saved photo may mark the predetermined position where the serial number is not read, and a color (red).

When the item code and the serial number of an outer box of the item are not on the same plane, a single category of the item is placed. The scanning device can only identify the serial numbers of respective planes, and save all the serial numbers of the respective planes (CM1, CM2, CM3, CM4) and pictures of the respective planes;

when the item code and the serial number of the outer box of the item are on the same plane, multiple categories of the items may be placed. The scanning device identifies the item codes and the serial numbers, and at the same time saves all the serial numbers of the respective planes (CM1, CM2, CM3, CM4) and the pictures of the respective planes.

If the comparison result is that all items are checked and accepted, n=N1, and at the same time, all the serial numbers of the planes of CM1, CM2, CM3, and CM4 are read and marked with the corresponding color (for example, green), the serial numbers of the to-be-scanned items in these containers are all checked and accepted. At the same time, the item codes (single category or multiple categories), the serial numbers, the total number N1 of the serial numbers, the photos of the four planes (CM1, CM2, CM3, CM4), the container numbers, the operators, a time stamps and other information read in these containers are saved.

Not all items are checked and accepted: when n≠N1 or the photos of the planes of CM1, CM2, CM3, CM4 show that there is a unread serial number, for an item with the unread serial number, the automatic checking and accepting device is restarted to collect the serial number, or a manual collection (PDA scanning or manual inputting the serial number of the item) is performed on the item whose serial number is collected, until all the serial numbers of the items in these container are checked and accepted.

The above S301 to S307 are repeated to complete the entire checking and accepting process. The scanned item codes, the serial numbers, and serial numbers are summarized by performing statistic, including the photos of the four planes (CM1, CM2, CM3, CM4) of each of the item containers 103, all the item container numbers, identity information of the operator, the time stamp, etc.

Figure 11:
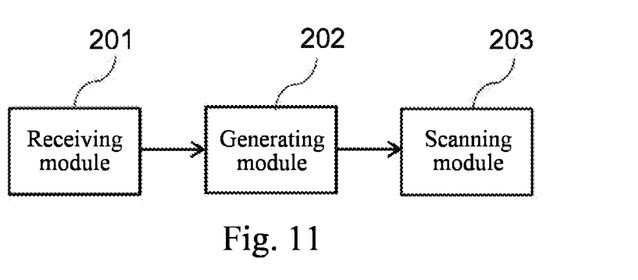
FIG. 11 is a schematic diagram of an architecture of an item scanning device in an embodiment of the present disclosure.

FIG. 11 is a schematic diagram of an architecture of an item scanning device in an embodiment of the present disclosure. As shown in FIG. 11, the present disclosure further provides an item scanning device, and the device includes:

a receiving module 201, configured to receive a positioning signal sent by the positioning device 3 when the rotation component 1 rotates to the different predetermined positions;

a generating module 202, configured to stop rotating the rotation component 1 according to the positioning signal and generate a scanning instruction; and a scanning module 203, configured to scan the to-be-scanned item placed on the rotation component 1 by the scanning device 2 according to the scanning instruction to acquire identification information on the to-be-scanned item.

In some embodiments, when scanning the to-be-scanned item placed on the rotation component 1 by the scanning device 2 according to the scanning instruction to acquire the identification information on the to-be-scanned item, the scanning module 203 may control the scanning device 2 to scan the item placed on the rotation component 1 according to a first preset scanning path. The first preset scanning path includes a plurality of scanning path points, and these scanning path points are preset according to the size of the item.

In some embodiments, when controlling the scanning device 2 to scan the item placed on the rotation component 1 according to a first preset scanning path, the scanning module 203 may be configured to: control, if the identification information is successfully scanned at a current scanning path point, the scanning device 2 to move according to the first preset scanning path to a next scanning path point to perform scanning, until the scanning path points on the first preset scanning path are fully scanned; and record, if the identification information is failed to be scanned at the current scanning path point, information of the current scanning path point, and control the scanning device 2 to move according to the first preset scanning path to the next scanning path point to perform scanning, until the scanning path points on the first preset scanning path are fully scanned.

In some embodiments, after the scanning path points on the first preset scanning path are fully scanned, the scanning module 203 may be further configured to control the scanning device 2 to: sequentially return to recorded scanning path points where scan of the identification information is failed, and to perform a second scan; and generate, if the second scan is failed, abnormal information, and photograph the scanning path point where the second scan is failed to record an item position corresponding to the scanning path point where the second scan is failed.

In some embodiments, the scanning module 203 may be further configured to, send the generated abnormal information directly to the handheld device of the item management staff, or send the abnormal information to the server, and the server forwards the abnormal information to the handheld device of the item management staff, so that when the staff receives the abnormal information, he may check the item corresponding to the scanning path point where the second scan is failed.

In some embodiments, after completing the second scan of the recorded scanning path points where the scan is failed, the scanning module 203 may be further configured to, control the rotation component 1 to rotate to a next predetermined position, and perform scanning according to a second preset scanning path, until the item is scanned at the respectively predetermined positions.

The second preset scanning path may be the same as or different from the first preset scanning path, and may alternatively include a plurality of scanning path points. These scanning path points are preset according to the size of the item.

In some embodiments, each of the predetermined positions corresponds to a preset scanning path, and preset scanning paths may be the same or different.

The present disclosure further provides an item scanning apparatus, and the apparatus includes: a processor and a memory; and the memory, storing an application program executable by the processor, being configured to cause the processor to perform the steps of the item scanning method.

Figure 12:
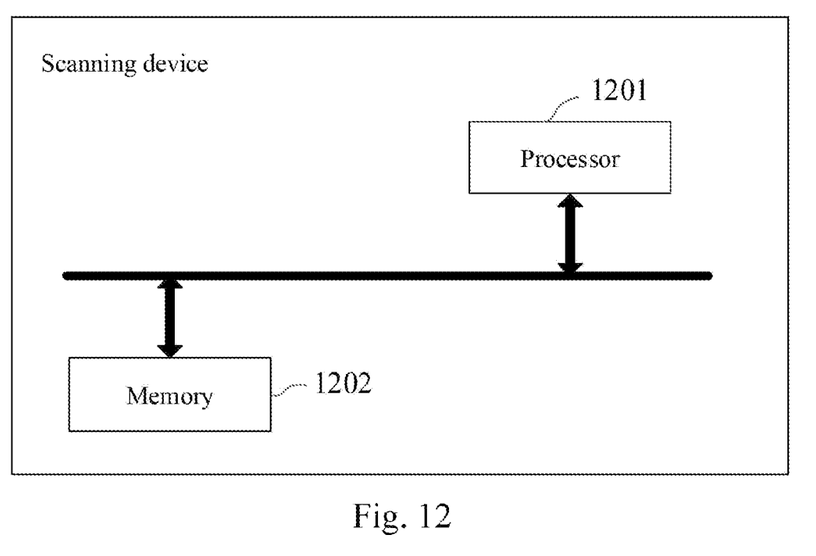
FIG. 12 is a hardware structure diagram of an item scanning apparatus in an embodiment of the present disclosure.

Based on the same technical concept, an embodiment of the present disclosure further provides a scanning apparatus. FIG. 12 is a hardware structure diagram of an item scanning apparatus in an embodiment of the present disclosure. As shown in FIG. 12, the apparatus includes at least one processor 1201 and a memory 1202 connected to the at least one processor. A connection medium between the processor 1201 and the memory 1202 is not limited in the embodiment of the present disclosure. In FIG. 12, as an example, the processor 1201 and the memory 1202 are connected through a bus. The bus may be classified as an address bus, a data bus, a control bus and so on.

In an embodiment of the present disclosure, the memory 1202 stores instructions that can be executed by the at least one processor 1201, and the at least one processor 1201 may perform the steps included in the above item scanning method by executing the instructions stored in the memory 1202.

The processor 1201 is a control center of the computing device, and may be connected to various parts of a terminal device by using various interfaces and lines. By running or executing the instructions stored in the memory 1202 and calling data stored in the memory 1202, the above item scanning method may be executed. In some embodiments, the processor 1201 may include one or more processing units, and the processor 1201 may be integrated with an application processor and a modem processor, where the application processor mainly deals with an operating system, a user interface, and the application program, etc., and the modem processor mainly deals with a wireless communication. It may be understood that the modem processor may not be integrated into the processor 1201. In some embodiments, the processor 1201 and the memory 1202 may be implemented on the same chip, and in some embodiments, they may alternatively be implemented on separate chips.

The processor 1201 may be a general-purpose processor, such as a central processing unit (CPU), a digital signal processor, an application specific integrated circuit (ASIC), a field programmable gate array or other programmable logic devices, discrete gate or transistor logic devices, discrete hardware components, which may implement or execute the methods, steps, and logic block diagrams disclosed in the embodiments of the present disclosure. The general-purpose processor may be a microprocessor or any conventional processor or the like. The steps of the method disclosed in the embodiments of the present disclosure may be directly embodied as being executed and completed by a hardware processor, or executed and completed by a combination of hardware and software modules in the processor.

The memory 1202, as a non-transitory computer-readable storage medium, may be configured to store non-transitory software programs, non-transitory computer-executable programs and modules. The memory 1202 may include at least one type of storage medium, for example, may include flash memory, hard disk, multimedia card, card-type memory, random access memory (RAM), static random access memory (SRAM), programmable read only memory (PROM), read only memory (ROM), electrically erasable programmable read-only memory (EEPROM), magnetic memory, magnetic disk, optical disk, etc. The memory 1202 is any other medium that can be used to carry or store desired program codes in the form of instructions or data structures and that can be accessed by the computer, but is not limited thereto. The memory 1202 in the embodiment of the present disclosure may alternatively be a circuit or any other apparatus capable of realizing a storage function for storing program instructions and/or data.

Therefore, the present disclosure further provides a computer-readable storage medium, storing a computer program thereon, the program, when executed by a processor, implements the steps included in the item scanning method.

The computer-readable storage medium stores instructions that, when executed by a processor, cause the processor to perform the steps of the method described above. In practical applications, the computer-readable medium may be included in the apparatus/device/system described in the above embodiments, or may exist alone without being assembled into the apparatus/device/system. The computer-readable storage medium carries one or more programs, and when the one or more programs are executed, the item scanning method is implemented according to the item scanning device described with reference to FIG. 10.

According to the embodiments of the present disclosure, the computer readable storage medium may be a non-transitory computer readable storage medium, for example, may include, but is not limited to a portable computer disk, a hard disk, a random access memory (RAM), a read only memory (ROM), an erasable programmable read only memory (EPROM or flash memory), a portable compact disk read only memory (CD-ROM), an optical memory, a magnet memory or any suitable combination of the above, which are not used to limit the protection scope of the present disclosure. In the embodiments of the present disclosure, the computer readable storage medium may be any physical medium containing or storing programs which can be used by or in combination with an instruction execution system, a device or an element.

It should be appreciated by those skilled in the art that various combinations of features recited in various embodiments and/or the claims of the present disclosure may be made even if such combinations are not expressly recited in the present disclosure. In particular, various combinations of features recited in various embodiments and/or the claims of the present disclosure may be made without departing from the spirit and teachings of the present disclosure, and all of such combinations fall within the scope of the present disclosure.

The principles and embodiments of the present disclosure are described with reference to specific embodiments herein, and the description of the embodiments is merely used to facilitate understanding of the method of the present disclosure and core thoughts of the present disclosure, and is not intended to limit the present disclosure. Variations in the detailed description and scope of disclosure may be made by those skilled in the art in accordance with the ideas, spirit and principles of the present disclosure, and any modifications, equivalents, improvements and the like are intended to be included within the protection scope of the present disclosure.

What is claimed is:

1. A scanning apparatus, the apparatus comprising a rotatable rotation component and a scanning device, and a positioning device, wherein:
the positioning device is configured for positioning the rotation component when the rotation component rotates to different predetermined positions respectively, and the scanning device is configured for scanning an item placed on the positioned rotation component;
wherein, a plurality of positioning marks are arranged at a periphery of a first surface of the rotation component around an axis of a rotation shaft of the rotation component, and each of the positioning marks corresponds to one of the predetermined positions, and a radial distance between each of the positioning marks and the rotation shaft is L;
wherein the positioning device is configured to perform a detection on the rotation component, a detection position of the positioning device is located on the first surface of the rotation component, and a radial distance between the detection position and the rotation shaft is L, so that during a rotation of the rotation component, the rotation component is positioned when the positioning device detects the positioning mark at the detection position.

2. The scanning apparatus according to claim 1, wherein, the positioning mark is a light-transmitting through hole, the light-transmitting through hole penetrates the rotation component, the positioning device is a photoelectric sensor, and a probe of the photoelectric sensor faces the detection position, so that during the rotation of the rotation component, the rotation component is positioned when the probe detects light transmitting through the light-transmitting through hole.

3. The scanning apparatus according to claim 1, wherein, the rotation component comprises a rotation part and a power device, and the power device drives the rotation part to rotate around the rotation shaft arranged vertically; and
the item is placed on a top surface of the rotation part a bottom surface of the rotation part is the first surface of the rotation component, and the probe is arranged close to the first surface.

4. The scanning apparatus according to claim 3, wherein, the item is placed on the top surface of the rotation part through an item container; and
a limit structure is arranged on at least one side of the top surface of the rotation part for limiting the item container.

5. The scanning apparatus according to claim 4, wherein, a slope is arranged at least one side of the rotation part, wherein one end of the slope is connected to the top surface of the rotation part, and an other end of the slope is in contact with a contact surface on which the rotation part is placed, such that a slope surface is formed.

6. The scanning apparatus according to claim 1, wherein, the scanning device is arranged at a side of the rotation component; and
the scanning device comprises a lifting moving device and/or a lateral moving device, and a scanning head.

7. The scanning apparatus according to claim 6, wherein, if the scanning device comprises the lifting moving device and the lateral moving device, and the scanning head, the lateral moving device is arranged on the lifting moving device, so that the lifting moving device drives the lateral moving device to move up and down, and the scanning head is arranged on the lateral moving device, so that the lateral moving device drives the scanning head to move laterally; and
the scanning head is directed to a position where the item is placed on the rotation component, so as to scan the item.

8. The scanning apparatus according to claim 6, wherein, after the positioning mark positions the rotation component, at least one plane of the item placed on the rotation component positioned by the positioning mark is parallel to a plane of a moving direction of the lifting moving device or the lateral moving device.

9. A scanning method, executed by a scanning apparatus, the apparatus comprising a rotatable rotation component and a scanning device, and a positioning device, wherein: the positioning device is configured for positioning the rotation component when the rotation component rotates to different predetermined positions respectively, and the scanning device is configured for scanning an item placed on the positioned rotation component wherein, a plurality of positioning marks are arranged at a periphery of a first surface of the rotation component around an axis of a rotation shaft of the rotation component, and each of the positioning marks corresponds to one of the predetermined positions, and a radial distance between each of the positioning marks and the rotation shaft is L; wherein the positioning device is configured to perform a detection on the rotation component, a detection position of the positioning device is located on the first surface of the rotation component, and a radial distance between the detection position and the rotation shaft is L, so that during a rotation of the rotation component, the rotation component is positioned when the positioning device detects the positioning mark at the detection position; and wherein the method comprises:
receiving a positioning signal sent by the positioning device when the rotation component rotates to the different predetermined positions;
stopping rotating the rotation component according to the positioning signal and generating a scanning instruction; and
scanning the item placed on the rotation component by the scanning device according to the scanning instruction to acquire identification information on the to-be-scanned item.

10. The scanning method according to claim 9, wherein, the scanning the item placed on the rotation component by the scanning device according to the scanning instruction to acquire identification information on the to-be-scanned item, comprises:
controlling the scanning device to scan the item placed on the rotation component according to a first preset scanning path.

11. The scanning method according to claim 10, wherein the first preset scanning path comprises a plurality of scanning path points;
wherein, the controlling the scanning device to scan the item placed on the rotation component according to a first preset scanning path, comprises:
controlling, in response to successfully scanning the identification information at a current scanning path point, the scanning device to move according to the first preset scanning path to a next scanning path point to perform scanning, until the scanning path points on the first preset scanning path are fully scanned; and
recording, in response to failing to scan the identification information at the current scanning path point, information of the current scanning path point, and controlling the scanning device to move according to the first preset scanning path to the next scanning path point to perform scanning, until the scanning path points on the first preset scanning path are fully scanned.

12. The scanning method according to claim 11, wherein, after the scanning path points on the first preset scanning path are fully scanned, the method further comprises:
controlling the scanning device to sequentially return to recorded scanning path points where scan of the identification information is failed, and performing a second scan; and
generating, in response to the second scan being failed, abnormal information, and photographing the scanning path point where the second scan is failed, to record an item position corresponding to the scanning path point where the second scan is failed.

13. The scanning method according to claim 12, wherein, after completing the second scan of the recorded scanning path points where the scan is failed, the method further comprises:
controlling the rotation component to rotate to a next predetermined position, and performing scanning according to a second preset scanning path.

14. The scanning method according to claim 9, wherein, before a step of receiving the positioning signal sent by the positioning device when the rotation component rotates to the different predetermined positions, the method further comprises:
entering shelf life information of the to-be-scanned item according to a first predetermined operation of a user.

15. The scanning method according to claim 9, wherein, before the step of receiving the positioning signal sent by the positioning device when the rotation component rotates to the different predetermined positions, the method further comprises:
acquiring a rated quantity of the to-be-scanned item according to a second predetermined operation of a user.

16. The scanning method according to claim 9, wherein, a weighing device is arranged on the rotation component, and is configured for weighing the to-be-scanned item, and before the step of receiving the positioning signal sent by the positioning device when the rotation component rotates to the different predetermined positions, the method further comprises:
acquiring a weight of the to-be-scanned item by the weighing device;
calculating an item quantity of the to-be-scanned item based on the weight and a preset single weight of the item; and
comparing the item quantity with the rated quantity to obtain a comparison result.

17. The scanning method according to claim 16, wherein, before the step of acquiring the weight of the to-be-scanned item by the weighing device, the method further comprises:
acquiring an item container number of the item container according to a third predetermined operation of a user.

18. A non-transitory computer-readable storage medium, storing a computer program thereon, wherein the program, when executed by a processor, implements a scanning method executed by a scanning apparatus, the apparatus comprising a rotatable rotation component and a scanning device, and a positioning device, wherein: the positioning device is configured for positioning the rotation component when the rotation component rotates to different predetermined positions respectively, and the scanning device is configured for scanning an item placed on the positioned rotation component wherein, a plurality of positioning marks are arranged at a periphery of a first surface of the rotation component around an axis of a rotation shaft of the rotation component, and each of the positioning marks corresponds to one of the predetermined positions, and a radial distance between each of the positioning marks and the rotation shaft is wherein the positioning device is configured to perform a detection on the rotation component, a detection position of the positioning device is located on the first surface of the rotation component, and a radial distance between the detection position and the rotation shaft is L, so that during a rotation of the rotation component, the rotation component is positioned when the positioning device detects the positioning mark at the detection position; and wherein the method comprises:
- receiving a positioning signal sent by the positioning device when the rotation component rotates to the different predetermined positions;
- stopping rotating the rotation component according to the positioning signal and generating a scanning instruction; and
- scanning the item placed on the rotation component by the scanning device according to the scanning instruction to acquire identification information on the to-be-scanned item.

* * * * *